(12) United States Patent
Imai et al.

(10) Patent No.: US 8,018,374 B2
(45) Date of Patent: Sep. 13, 2011

(54) RADAR

(75) Inventors: Katsuyuki Imai, Osaka (JP); Tomoo Ushio, Suita (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 210 days.

(21) Appl. No.: 12/376,063

(22) PCT Filed: Jul. 31, 2007

(86) PCT No.: PCT/JP2007/064944
§ 371 (c)(1),
(2), (4) Date: Apr. 22, 2009

(87) PCT Pub. No.: WO2008/016033
PCT Pub. Date: Feb. 7, 2008

(65) Prior Publication Data
US 2010/0001900 A1 Jan. 7, 2010

(30) Foreign Application Priority Data

Aug. 2, 2006 (JP) ................... 2006-211464

(51) Int. Cl.
*G01S 7/03* (2006.01)
*G01S 13/28* (2006.01)
*G01S 13/95* (2006.01)
*H01Q 3/04* (2006.01)
*H01Q 3/14* (2006.01)
*H01Q 19/06* (2006.01)

(52) U.S. Cl. ............ 342/135; 342/5; 342/11; 342/26 R; 342/26 D; 342/82; 342/89; 342/118; 342/128; 342/130; 342/131; 342/132; 342/134; 342/175; 342/195; 342/202; 342/204

(58) Field of Classification Search ................ 342/5, 11, 342/73–103, 118, 175, 192–197, 202–204, 342/368–377, 26 R–26 D, 59, 21, 22, 25 R–25 F, 127–133, 147, 155, 200, 201, 134–145; 343/700 R, 753–755, 907, 909
See application file for complete search history.

(56) References Cited

U.S. PATENT DOCUMENTS 2,888,674 A * 5/1959 Moreno ......................... 342/59
(Continued)

FOREIGN PATENT DOCUMENTS

JP 06-138215 5/1994
(Continued)

OTHER PUBLICATIONS

Monden, K., et al., "Preliminary Results of Broad-Band Radar for Meteorological Application", Information and Communication Engineers, 2004, p. 4, vol. B-1-4, Institute of Electronics.

(Continued)

*Primary Examiner* — Bernarr Gregory
(74) *Attorney, Agent, or Firm* — McDermott Will & Emery LLP

(57) ABSTRACT

A radar having a high time and high spatial resolution and being capable of performing volume scanning with an inexpensive and simple structure, while enabling reduction is size and weight. A radar (50) is provided with an antenna unit (51) including a radio wave lens antenna device, which has a spherical transmission radio wave lens (2), a spherical reception radio wave lens (3), a primary radiator (4) arranged at a focal point of the radio wave lens (2), and a primary radiator (5) arranged at a focal point of the radio wave lens (3). The primary radiators (4, 5) pivot in an elevation direction about an axis connecting center points of the radio wave lenses (2, 3) and pivot in an azimuthal direction about an axis orthogonal to the axis connecting the center points of the radio wave lenses (2, 3).

20 Claims, 11 Drawing Sheets

U.S. PATENT DOCUMENTS

| | | | |
|---|---|---|---|
| 4,025,921 A * | 5/1977 | Brookner et al. | 342/155 |
| 4,067,009 A * | 1/1978 | Constant | 342/25 A |
| 4,965,573 A * | 10/1990 | Gallagher et al. | 342/26 B |
| 5,781,163 A | 7/1998 | Ricardi et al. | |
| 6,333,718 B1 | 12/2001 | Poncel et al. | |
| 6,380,904 B1 | 4/2002 | Ogawa | |
| 7,019,682 B1 * | 3/2006 | Louberg et al. | 342/22 |

FOREIGN PATENT DOCUMENTS

| | | |
|---|---|---|
| JP | 11-014749 | 1/1999 |
| JP | 2000-165131 | 6/2000 |
| JP | 2001-102857 | 4/2001 |
| JP | 2003-110352 | 4/2003 |
| JP | 2005-061905 | 3/2005 |
| JP | 2007-181114 | 7/2007 |
| WO | WO 2007/074943 A1 | 7/2007 |

OTHER PUBLICATIONS

International Preliminary Report on Patentability and Written Opinion of the International Searching Authority, issued in corresponding International Patent Application No. PCT/JP2007/064944, mailed Feb. 10, 2009.

* cited by examiner

RADAR

RELATED APPLICATIONS

This application is the U.S. National Phase under 35 U.S.C. §371 of International Application No. PCT/JP2007/064944, filed on Jul. 31, 2007, which in turn claims the benefit of Japanese Application No. 2006-211464, filed on Aug. 2, 2006, the disclosures of which Applications are incorporated by reference herein.

FIELD OF THE INVENTION

The present invention relates to a radar for transmitting and receiving high-frequency radio waves through a radio wave lens antenna device.

BACKGROUND OF THE INVENTION

In the prior art, various types of radars are used for the purpose of meteorological observations, air traffic control, and the like. Such radars detect the size, shape, distance, velocity, and the like of a target by emitting high-frequency radio waves, such as microwave, from an antenna towards the target, and receiving reflected waves or scattered wave from the target. For example, a meteorological radar for observing meteorological conditions emits radio waves toward water droplets, such as rain, and analyzes the reflected waves that are received to determine, for example, the size of the area of precipitation or the amount of precipitation.

Such radar normally implements a monostatic technique, in which signals are transmitted and received with one antenna and the connection of the antenna with a transmitter and a receiver is switched, and a bistatic technique, which a transmission antenna connected to a transmitter and a reception antenna connected to a receiver are used.

For the monostatic technique, there has been disclosure of, for example, a meteorological observation radar including a transmitter for generating and outputting pulse-shaped high-frequency signals, an antenna for emitting the high-frequency signals generated by the transmitter toward the atmosphere as high-frequency radio waves and receiving high-frequency radio waves reflected or scattered by a target, a receiver for receiving the high-frequency radio waves reflected by an object through the antenna, and a circulator serving as a switching means for switching between transmission of the high-frequency signals from the transmitter to the antenna and transmission of the high-frequency signals from the antenna to the receiver (for example, refer to patent document 1).

In recent years, the technology related to meteorological prediction simulation (numerical forecast model) has gone through a drastic improvement in accuracy and calculation speed due to the increased computer calculation processing speeds and development of various algorithms. Nowadays, there is a demand for higher density, higher time resolution, and higher spatial resolution of the initial value data used for the meteorological prediction simulation. The time resolution herein refers to the time necessary to collect a piece of observation data. The time resolution improves as the time becomes shorter. Such a case is referred to as a satisfactory time resolution. The spatial resolution refers to the size of the region including a target (reflecting body or scattering body) that is observable by the radar. The spatial resolution improves as the region becomes smaller. Such a case is referred to as a satisfactory spatial resolution.

In the radar described in patent document 1, however, the entire atmosphere above the ground surface undergoes beam scanning (hereinafter referred to as "volume scanning"). Thus, when observing clouds and rain droplets, the range resolution (resolution in range direction, namely, the direction in which the radar emits radio waves or the direction in which radio waves travel, the radial direction $\gamma$ when the spatial coordinate system is defined with polar coordinates ($\gamma$, $\theta$, $\phi$)) is several tens of meters and relatively long. Further, the time resolution is also several minutes and relatively long. Accordingly, the resolution is insufficient from the standpoint of higher accuracy for a meteorological prediction simulation.

In other words, for a rapidly-growing target such as thundercloud, a time resolution of several minutes is too long to analyze the generation mechanism of the thundercloud. In addition, when the range resolution is several tens of meters, fine dispersions such as distribution of particle density cannot be observed.

This is due to the fact that the antenna used for the radar described in patent document 1 generally has a diameter of several meters. Furthermore, when performing volume scanning with an antenna having such a large diameter, the scale of a mechanism that drives the antenna is large and the structure of the antenna device is thus complicated. Furthermore, the entire antenna device increases in size and weight. This raises costs.

Additionally, it would be difficult to install many radars including such large and costly antenna devices. Thus, to cope with such a problem, the transmission power can be increased to between several tens of watts and several kilowatts to increase the observation area (observable distance) and thereby enlarge the observation area. However, this would further raise costs.

[Patent Document 1] Japanese Laid-Open Patent Publication No. 11-14749

SUMMARY OF THE INVENTION

The present invention provides a radar including a radio wave lens antenna device, in which the radar device has a high time resolution and high spatial resolution, has an inexpensive and simple structure, is capable of performing volume scanning, and can be reduced in size and weight.

One aspect of the present invention is a radar. The radar is provided with a signal processing unit including at least one D/A converter, which converts digital waveform data to analog waveform data and generates a pulse compression modulation signal, and at least one A/D converter, which converts a received analog signal to a digital signal and performs pulse compression demodulation. A transmitter unit includes at least one oscillator, which frequency up-converts the pulse compression modulation signal generated by the signal processing unit, and a first amplifier, which amplifies the frequency up-converted pulse compression modulation signal and generates an RF signal. An antenna unit radiates the RF signal generated by the transmitter unit towards the atmosphere as RF waves and receives RF waves reflected or scattered in the atmosphere and returned as a RF signal. A receiver unit includes a second amplifier which amplifies the RF signal received by the antenna unit. The receiver frequency-down converts the RF signal, which is amplified by the second amplifier, with the at least one oscillator to generate an IF signal and provides the IF signal to the signal processing unit as the analog signal. The antenna unit includes first and second transmission-reception radio wave lenses, in which the first and second transmission-reception radio wave lenses each include a focal point and are each formed from a dielectric to be spherical so as to have a relative permittivity that varies at a predetermined rate in a radial direction. First and second transmission-reception primary radiators are respectively arranged at the focal points of the first and second transmission-reception radio wave lenses. The first and second transmission-reception primary radiators are configured to pivot in an elevation direction about a first axis connecting a center point of each of the first and second transmission-reception radio wave lenses and pivot in an azimuthal direction about a second axis orthogonal to the first axis.

In this structure, the transmission-reception primary radiators are pivoted in the elevation direction and the azimuthal direction to perform volume scanning. Accordingly, when volume scanning is performed, time and spatial resolutions are drastically improved. As a result, the radar may perform volume scanning with a high time and high spatial resolution. Further, a complicated drive mechanism for performing volume scanning is unnecessary. This simplifies the antenna unit and enables volume scanning to be performed with a simple structure. Further, the cost of the antenna unit is prevented from increasing, and the antenna unit can be reduced in size and weight. The RF waves are radiated toward the atmosphere from the transmission-reception primary radiators by way of the transmission-reception radio wave lenses in a direction that is along extensions connecting each of the centers of the transmission-reception radio wave lenses and transmission-reception radiators. Further, the incident direction of very weak RF waves, which are reflected by the atmosphere and returned, enter the transmission-reception radiators by way of the transmission-reception radio wave lenses.

In the radar, the antenna unit may further include a holding member which holds the first and second transmission-reception primary radiators pivotally in the elevation direction, a support member which pivotally supports the holding member, and a rotary member which fixes the support member and is rotatable in the azimuthal direction about the second axis. Further, the first and second transmission-reception primary radiators may pivot in the elevation direction in cooperation with the pivoting of the holding member and pivot in the azimuthal direction in cooperation with the rotation of the rotary member.

In this structure, the holding member, which holds the transmission-reception primary radiators, may be pivoted in the elevation direction, and the rotary member may be rotated in the azimuthal direction. This enables volume scanning to be performed with a simple structure.

In the radar, the transmitter unit may further include another oscillator for frequency up-converting the pulse compression modulation signal and frequency down-converting the received RF signal.

In this structure, through a plurality of steps, a signal having the desired center frequency may be generated by frequency up-converting the pulse compression modulation signal and frequency down-converting the received RF signal. Accordingly, in comparison with when using only one oscillator, frequency up-conversion and frequency down-conversion for obtaining a signal having the desired center frequency may be performed with ease.

In the radar, the signal processing unit may generate the pulse compression modulation signal with a bandwidth settable in a range of 5 MHz to 200 MHz, and the at least one oscillator (60) may frequency up-convert the pulse compression modulation signal to a signal having a center frequency of 1 GHz to 20 GHz.

In this structure, when performing volume scanning, for example, when generating a pulse compression modulation signal having a bandwidth of 60 MHz, a high range resolution such as 2.5 m may be obtained. This enables the radar to be useful for observing tornadoes having a scale of 20 m to 30 m.

In the radar, the signal processing unit generates the pulse compression modulation signal by performing pulse compression modulation with a frequency chirp, and alternately repeats up-chirping and down-chirping for every transmission pulse.

In this structure, the range resolution in the range direction is improved by performing pulse compression modulation with a frequency chirp. Further, by alternately repeating up-chirping and down-chirping for every transmission pulse, observation errors resulting from overlapping are suppressed. The term "overlapping" used here refers to a phenomenon in which radio waves that have been radiated are reflected at a far distance and returned at the same time as when reflected waves of newly transmitted radio waves are returned.

The radar further includes at least one third transmission-reception radio wave lens arranged along the elevation direction at the focal point of at least one of the first and the second transmission/reception radio wave lenses.

In this structure, a plurality of signals may be simultaneously transmitted and received in the elevation direction. Accordingly, a plurality of segments may be measured at the same time. This improves the simultaneity of collected data and shortens the scanning time in the elevation direction.

The present invention provides a radar having a high time and spatial resolution. Further, the present invention provides a radar that can perform volume scanning with an inexpensive and simple structure, while enabling reduction in size and weight.

DETAILED DESCRIPTION OF THE PREFERRED EMBODIMENTS

First Embodiment

Figure 1:
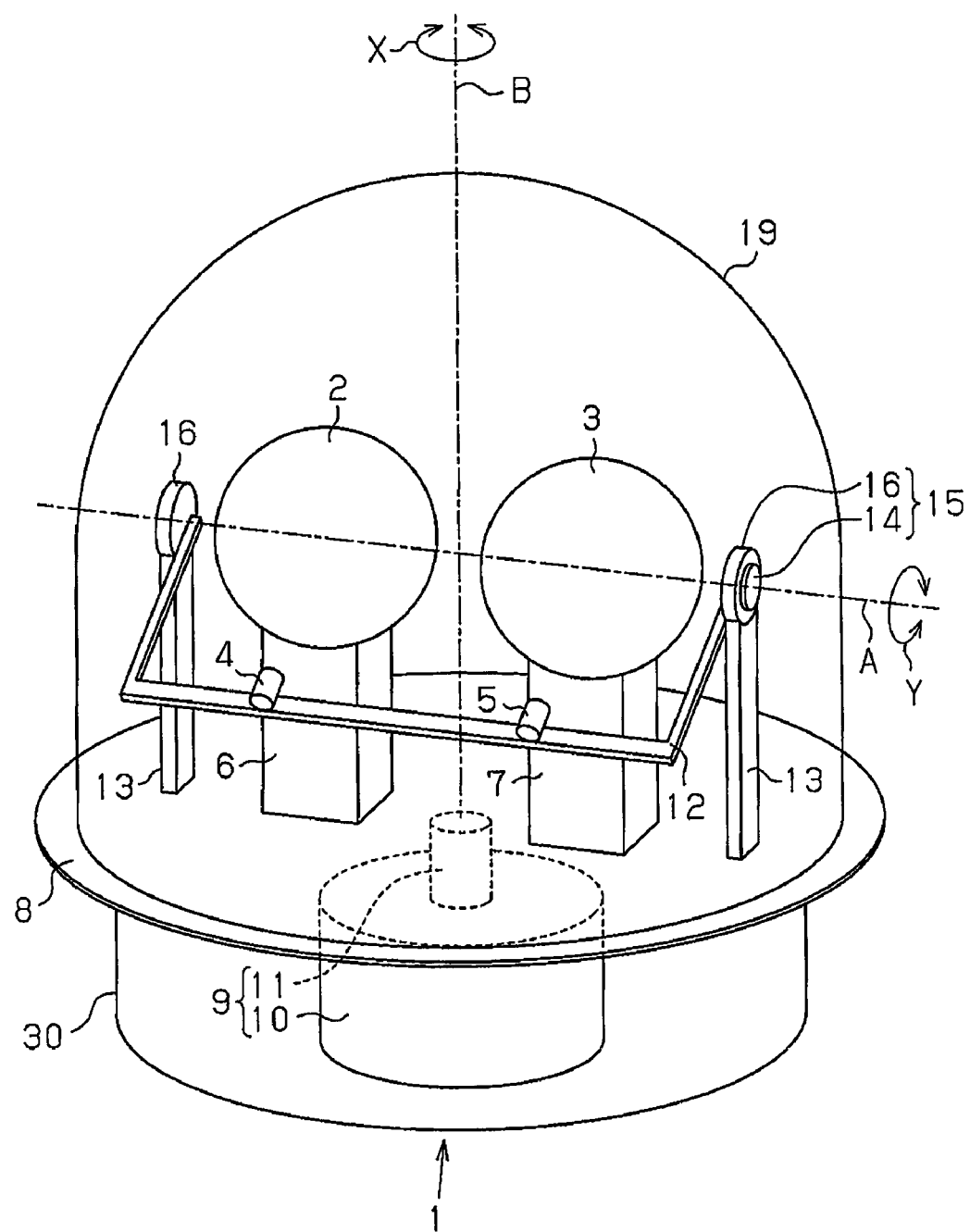
FIG. 1 is a schematic diagram showing the entire structure of a radio wave lens antenna device in a radar according to a first embodiment of the present invention.
Figure 2:
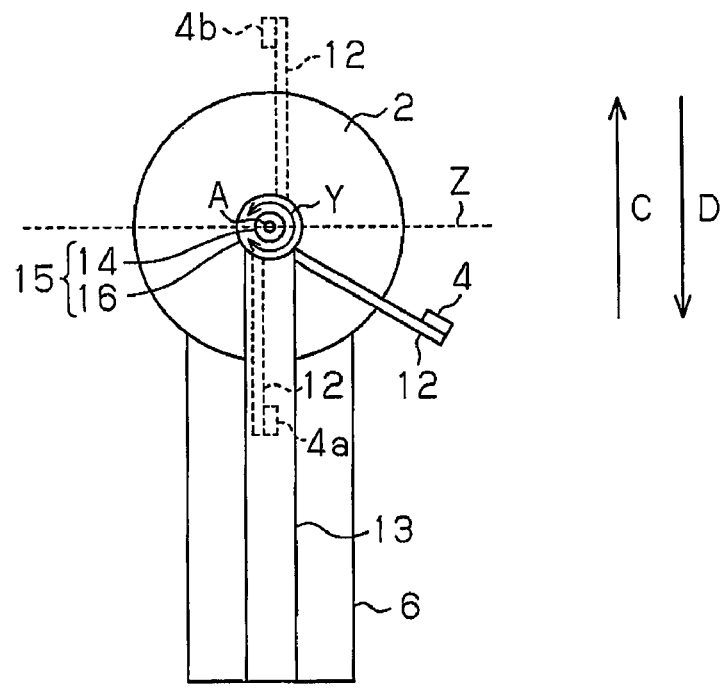
FIG. 2 is a diagram showing the pivoting of a primary radiator for the radio wave lens antenna device in the radar according to the first embodiment of the present invention and is a view of the radio wave lens antenna device of FIG. 1 taken from a transmission radio wave lens side.

Preferred embodiments of the present invention will be discussed hereafter. FIG. 1 is a schematic diagram showing the entire structure of a radio wave lens antenna device for a radar according to a first embodiment of the present invention. FIG. 2 is a diagram showing a pivoting operation of a primary radiator for the radio wave lens antenna device shown in FIG. 1 and is a view of the radio wave lens antenna device of FIG. 1 taken from the transmission radio wave lens side. As shown in FIG. 1, the radio wave lens antenna device 1, which is a bistatic antenna device, includes two transmission and reception radio wave lenses 2 and 3 and two transmission and reception primary radiators 4 and 5, which are respectively arranged at the focal points of the transmission and reception radio wave lenses 2 and 3. More specifically, the radio wave lens antenna device 1 includes the transmission radio wave lens 2, the reception radio wave lens 3, the primary radiator 4 arranged at the focal point of the transmission radio wave lens 2, and the primary radiator 5 arranged at the focal point of the reception radio wave lens 3.

The radio wave lenses 2 and 3, which are spherical Luneberg lenses, each include a central spherical shell and a plurality of spherical shells, which enclose the central spherical shell and have different diameters. Each of the radio wave lens 2 and 3 is formed from a dielectric so that the relative permittivity varies at a predetermined rate in the radial direction. The relative permittivity $\in\gamma$ for the spherical shells of the radio wave lens 2 and 3 is set to be approximately in accordance with the equation of $\in\gamma=2-(r/R)^2$. For instance, the relative permittivity of each of the radio wave lens 2 and 3 varies from about two to about one from the central portion towards the outer side. In the above equation, R represents the radius of the sphere, and r represents the distance from the center of the sphere. In the first embodiment, the radio wave lenses 2 and 3 have a diameter of, for example, 600 mm or 450 mm. A dielectric is paraelectric, ferroelectric, or antiferroelectric and not conductive.

The typical dielectric used for the Luneberg lens is a foam formed from a synthetic resin of a polyolefin, such as polyethylene resin, polypropylene resin, and polystyrene resin. An inorganic high-dielectric filler, such as titanium oxide, titanate, and zirconate, is added to the synthetic resin to form a foam. The relative permittivity of such a dielectric foam is adjusted to a target value by varying the foam magnification and controlling the specific gravity. A higher relative permittivity is obtained with a higher specific gravity.

To manufacture the dielectric foam, for example, a chemical foaming process may be performed in which a foaming agent, which dissolves when heated to generate a gas such as nitrogen gas, is added to a raw material (solely a synthetic resin or a mixture of synthetic resin and an inorganic high-dielectric filler) and then filled into a mold, which has the desired shape, to undergo foaming. A beads-foaming process may also be performed in which pellet-shaped material impregnated with a volatile foaming agent is pre-foamed outside a mold in advance so as to obtain pre-foamed beads. The pre-foamed beads are filled into the mold, which has the desired shape, and then heated by water vapor or the like to undergo re-foaming. At the same time, adjacent beads are fused to one another.

As shown in FIG. 1, the radio wave lenses 2 and 3 are respectively supported by support members 6 and 7. Each of the support members 6 and 7 is attached to a table 8, which is a rotary member rotatable about an azimuthal direction (i.e., direction indicated in the drawing by arrow X and extending about axis B, which is orthogonal to axis A connecting the center points of the radio wave lenses 2 and 3). The table 8 requires strength that withstands the weight of the radio wave lenses 2 and 3 and support members 6 and 7, which are arranged on the table 8, and also withstands high-speed rotation. Accordingly, it is preferable that the weight of the table 8 be light. It is preferred that fiber reinforced plastic (FRP) material be used as the material for forming the table 8. Examples of fiber reinforced materials for fiber reinforced plastic materials include glass fiber, aramid fiber, or silica fiber. The plastic that becomes the matrix of the fiber reinforced plastic material includes unsaturated polyester resin, phenol resin, epoxy resin, or bismaleimide resin. The table 8 may be formed from a metal plate. To reduce weight of the table 8, for example, a metal plate may undergo a drawing process to form ribs.

Moreover, to further reduce weight, the table 8 may be configured to have a sandwich structure. More specifically, a sandwich structure may be formed by covering the outer surface of polyester or the like with fiber reinforced plastic. Further, a honeycomb (aluminum, aramid, etc.) may be used instead of a foam.

A drive means 9 for the table 8 shown in FIG. 1 is a drive source for driving the table 8 and includes a motor 10, which is capable of producing rotation in forward and reverse directions, and a shaft 11, which is connected to the motor 10 and rotated in the forward and reverse directions by the motor 10. As shown in FIG. 1, the drive means 9 is accommodated in a base 30, and the table 8 is mounted on the base 30. When a computer (not shown), which serves as a control means, drives the motor 10 and rotates the shaft 11, the drive force of the motor 10 is transmitted to the table 8 by the shaft 11. This rotates the table 8 in the above-described azimuthal direction X extending about axis B, which is orthogonal to axis A connecting the center points of the radio wave lenses 2 and 3 (hereinafter referred to as "center axis A of the radio wave lenses 2 and 3"). With such a structure, the radar is capable of performing scanning in any azimuthal direction X.

Each of the primary radiators 4 and 5 is usually an electromagnetic horn antenna including a rectangular or circular opening, a dielectric rod antenna having a dielectric rod attached to a waveguide, or the like. However a micro-strip antenna, a slot antenna, or the like may also be used. The directivity (polarized waves) of the electric field of the radio waves transmitted from and received by the primary radiators 4 and 5 may be either one of linear polarized waves (e.g., vertical polarized waves or horizontal polarized waves) or circular polarized waves (e.g., right-handed polarized waves or left-handed polarized waves).

Each of the primary radiators 4 and 5 is pivotal in an elevation direction (i.e., direction indicated in the drawing by arrow Y and extending about the center axis A of the radio wave lenses 2 and 3) along the surfaces of the radio wave lenses 2 and 3. More specifically, as shown in FIG. 1, each of the primary radiators 4 and 5 is held on an arm 12, which serves as a holding member and is generally horseshoe-shaped. The arm 12 is supported in a pivotal manner by pins 14 arranged in support members 13, which are attached to the table 8. The material of the arm 12 is not particularly limited as long as it is formed from a light material. For example, the arm 12 may be formed from a generally horseshoe-shaped metal piece. An arm 12 formed from wood may be used as long as it is covered by a radome 19, which will be described later, to avoid contact with the atmosphere. The arm 12 is pivotal in the elevation direction Y about a pivot axis, which is the center axis A of the radio wave lenses 2 and 3. A drive means 15 shown in FIG. 1 and FIG. 2 serves as a drive source for driving the arm 12 and includes a motor 16, which produces rotation in forward and reverse directions. The above-described pins 14 are connected to the motor 16 and rotated in the forward and reverse directions by the motor 16. When the above-described computer drives the motor 16 and rotates the pins 14, the drive force of the motor 16 is transmitted to the arm 12 by the pins 14. This pivots the arm 12 which in turn pivots the primary radiators 4 and 5 held by the arm 12 in the elevation direction Y about the center axis A of the radio wave lenses 2 and 3 in cooperation with the pivoting of the arm 12.

During scanning, when the horizontal direction is defined as 0°, the arm 12 (or primary radiators 4 and 5) is configured to be pivotal in the elevation direction Y about the center axis A of the radio wave lenses 2 and 3 in a range of −90° or greater to 90° or less. More specifically, for example, as shown in FIG. 2, when the horizontal direction (i.e., direction indicated by Z in the drawing) is defined as 0°, the primary radiator 4 is configured to be pivotal in the elevation direction Y from a state in which it scans the zenithal direction (i.e., direction of arrow C or vertically upward direction, state in which the primary radiator 4a is pivoted to −90°) to a state in which it scans the ground surface direction (i.e., direction of arrow D or vertically downward direction, state in which the primary radiator 4b is pivoted to 90°). With such a structure, scanning may be performed for a wide range in the elevation direction Y.

As described above, each of the primary radiators 4 and 5 is held by the arm 12, and the arm 12 is supported by the support members 13, which are attached to the table 8. Therefore, in cooperation with the rotation of the table 8 in the azimuthal direction X, each of the primary radiators 4 and 5 pivots in the azimuthal direction X about the axis B, which is orthogonal to the axis A connecting the center points of the radio wave lenses 2 and 3. With such a structure, the radar can perform volume scanning in any azimuthal direction X.

Figure 3:
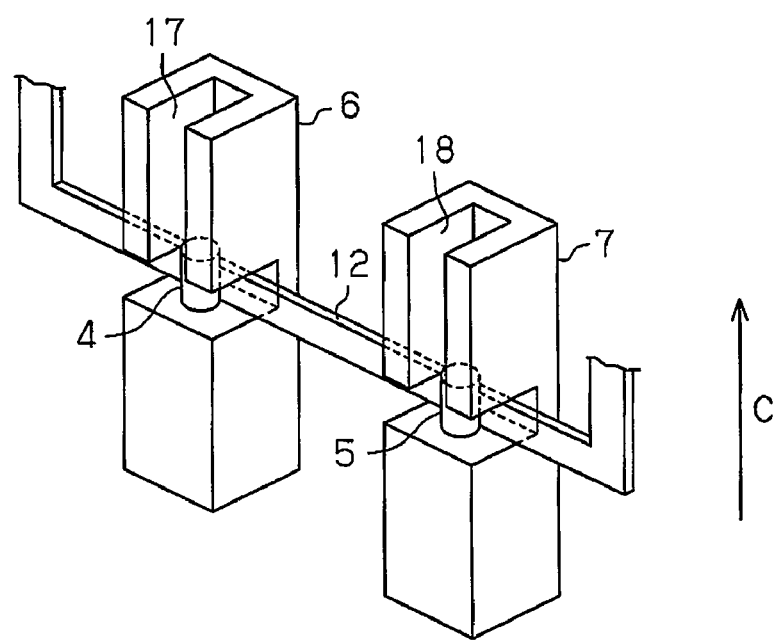
FIG. 3 is a schematic diagram showing support members for supporting the radio wave lenses of the radio wave lens antenna in the radar according to the first embodiment of the present invention.

The radiation direction of RF waves (or high-frequency radio waves) radiated from the primary radiator 4 towards the atmosphere through the radio wave lens 2 extends along a line connecting the centers of the radio wave lens 2 and the primary radiator 4. The incident direction of the very weak RF waves, which return after being reflected or scattered in the atmosphere, enters the primary radiator 5 through the radio wave lens 3 along a line extending through the centers of the radio wave lens 3 and the primary radiator 5. Accordingly, as shown in FIG. 3, in the first embodiment, retaining portions 17 and 18 for retaining the primary radiators 4 and 5 are respectively formed in the support members 6 and 7, which support the radio wave lenses 2 and 3, to avoid interference between the primary radiator 4 and support member 6 and interference between the primary radiator 5 and support member 7. As a result, interference between the primary radiator 4 and the support member 6 is avoided when radiating RF waves in the zenithal direction (i.e., direction of arrow C shown in FIG. 3) from the primary radiator 4 through the radio wave lens 2. Furthermore, interference between the primary radiator 5 and the support member 7 is avoided when receiving RF waves reflected or scattered in the atmosphere with the primary radiator 5 through the radio wave lens 3 in the zenithal direction C. As shown in FIG. 3, the retaining portions 17 and 18 in the first embodiment have a generally horseshoe-shaped cross-section.

As shown in FIG. 1, the radio wave lens antenna device 1 includes the radome 19, which protects components such as the radio wave lenses 2 and 3, the primary radiators 4 and 5, and the support members 6 and 7 from wind, rain, and snow. The radome 19 is supported by the table 8, and the components such as the radio wave lenses 2 and 3, the primary radiators 4 and 5, and the support members 6 and 7 are accommodated in the radome 19.

It is preferred that a fiber reinforced plastic (FRP) material be used as the material forming the radome 19 in the first embodiment since the radome 19 needs to have superior radio wave transmissivity.

Figure 4:
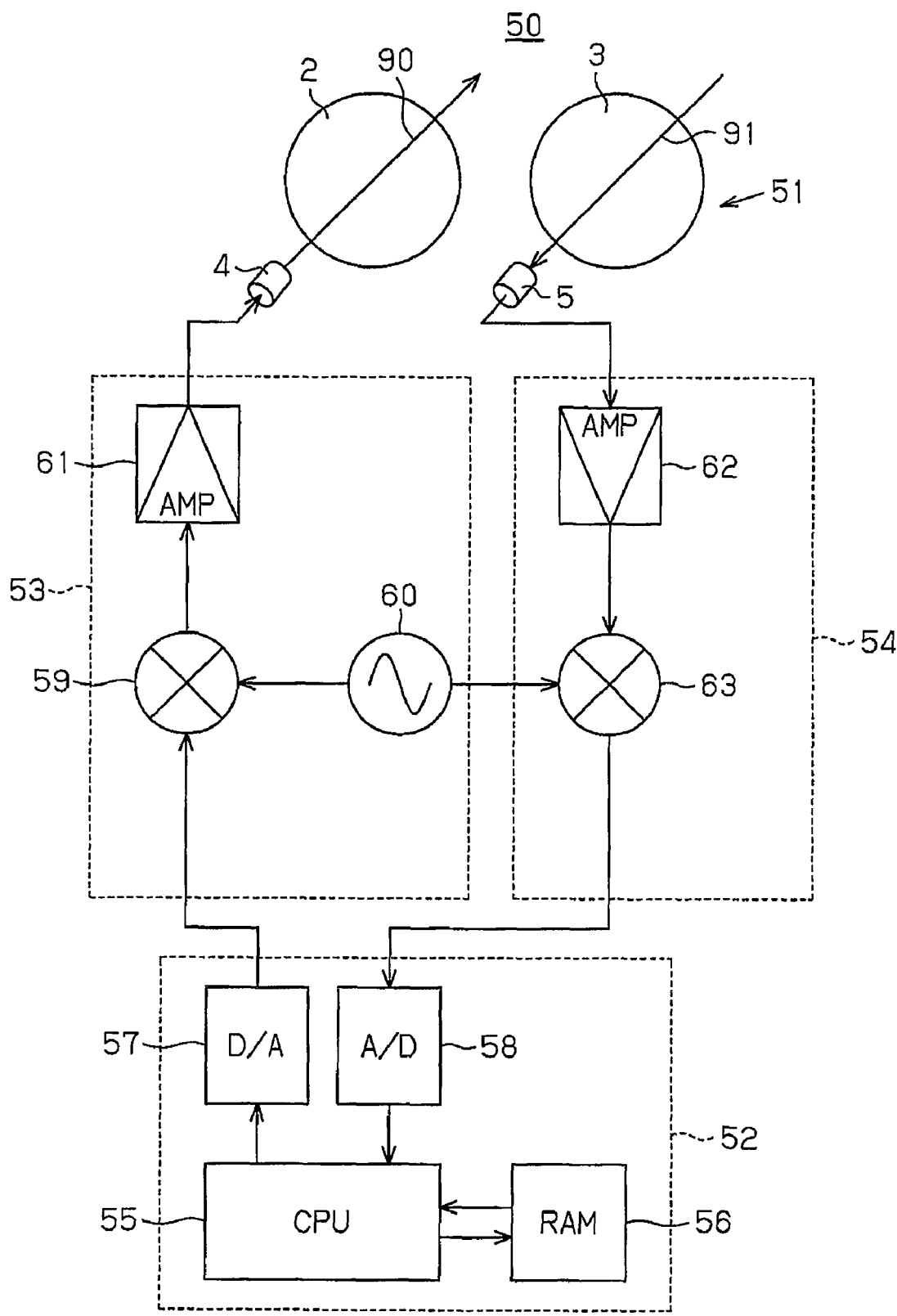
FIG. 4 is a schematic diagram showing the entire structure of the radar in the first embodiment.

A radar employing the radio wave lens antenna device 1 will now be described. FIG. 4 is a schematic diagram showing the entire structure of the radar in the first embodiment. In the first embodiment, a meteorological radar is used as an example of the radar. FIG. 4 shows only the radio wave lenses 2 and 3 and the primary radiators 4 and 5 in the radio wave lens antenna device 1 are shown and do not show other members.

As shown in FIG. 4, a radar 50 includes an antenna unit 51 formed by the radio wave lens antenna device 1, a signal processing unit 52 for generating a transmitted pulse compression modulation signal and performing pulse compression demodulation on the received analog signal, and a transmitter unit 53 connected to the signal processing unit 52 and the primary radiator 4 to amplify the pulse compression signal generated by the signal processing unit 52 and generate an RF signal. The radar 50 also includes a receiver unit 54, which is connected to the signal processing unit 52 and the primary radiator 5, to amplify signals of very weak returning RF waves (i.e., RF signal) that have been reflected or scattered backward.

The signal processing unit 52 includes a CPU 55 serving as a control means, a RAM 56 for storing digital waveform data, a D/A converter 57, and an A/D converter 58. The transmitter unit 53 includes a mixer 59, which is formed, for example, by a diode, to receive the pulse compression modulation signal generated by the signal processing unit 52, a oscillator 60 for frequency up-converting the pulse compression modulation signal, and an amplifier 61 for amplifying the frequency up-converted pulse compression modulation signal. The receiver unit 54 includes an amplifier 62, which amplifies the RF signal received by the antenna unit 51, and a mixer 59, which is formed by a diode and receives the RF signal amplified by the amplifier 62.

When beam scanning is performed, the signal processing unit 52 first generates a pulse compression modulation signal having a bandwidth set in a range of 5 MHz to 200 MHz. For instance, a pulse compression modulation signal having a center frequency of 60 MHz and a bandwidth of 80 MHz, that is, a pulse compression modulation signal of which frequency varies in a range of 20 MHz to 100 MHz is generated. Then, the pulse compression modulation signal is sent to the transmitter unit 53. More specifically, the CPU 55 reads digital waveform data from the RAM 56. Then, the D/A converter 57 converts the digital waveform data to analog waveform data and generates a pulse compression modulation signal or an IF signal (intermediate frequency signal). The pulse compression modulation signal is provided to the transmitter unit 53. The pulse compression modulation signal may be generated using digital waveform data obtained from input parameters, such as frequency and time.

Typical modulation processes include amplitude modulation, frequency modulation, phase modulation, code modulation, and the like. In the first embodiment, frequency modulation is performed and a process for chirping the transmission frequency is employed. In other words, the signal processing unit 52 generates a pulse compression modulation signal by performing frequency chirp during pulse compression modulation to alternately perform up-chirping (vary from a low frequency to a high-frequency, in this case, vary from 20 MHz to 100 MHz) and down-chirping (vary from a high-frequency to a low frequency, in this case, vary from 100 MHz to 20 MHz) for every transmission pulse in a repetitive manner.

The pulse compression modulation signal provided to the transmitter unit 53 and input to the mixer 59 is frequency up-converted to a signal having a center frequency of 1 GHz to 20 GHz by the oscillator 60. For example, if the oscillator 60 is transmitting a signal of 15 GHz (15000 MHz), the pulse compression modulation signal is frequency up-converted from 15020 MHz to 15100 MHz. The amplifier 61 amplifies the pulse compression modulation signal, which has been frequency up-converted, to generate an RF signal. The RF signal generated by the transmitter unit 53 is then output to the antenna unit 51 and input to the primary radiator 4 of the antenna unit 51. The RF signal is radiated from the primary radiator 4 towards the atmosphere through the transmission radio wave lens 2 as high-frequency radio waves (RF wave) 90.

Subsequently, the antenna unit 51 receives very weak high-frequency radio waves (RF wave) 91, which is reflected or scattered in the atmosphere and returned as a RF signal, with the primary radiator 5 through the reception radio wave lens 3 of the antenna unit 51. The RF signal, which is an analog signal, is input to the receiver unit 54. The RF signal input to the receiver unit 54 is amplified by the amplifier 62, and the amplified RF signal is input to the mixer 63. The oscillator 60 in the transmitter unit 53 frequency down-converts the amplified RF signal, which is input to the mixer 63, to an IF signal having a center frequency of about 60 MHz and a bandwidth of 80 MHz. That is, the IF signal has a frequency that varies in the range of about 20 MHz to 100 MHz. The IF signal generated through the frequency down-conversion is output to the signal processing unit 52 as a received analog signal. The IF signal provided to the signal processing unit 52 is input to the A/D converter 58 of the signal processing unit 52. The A/D converter 58 converts the IF signal to a digital signal by undergoing pulse compression demodulation, and the digital signal is output to the CPU 55. The CPU 55 processes the digital signal to obtain various meteorological information such as the size of the area of precipitation or the amount of precipitation. The oscillator 60 does not have to be arranged in the transmitter unit 53 and may be arranged at any position as long as it can be commonly used when performing frequency up-conversion and down-conversion on a signal. FPGA, DSP, or the like may be used in place of the CPU 55.

The radar 50 of the first embodiment has the advantages described below.

(1) The radio wave lens antenna device 1 in the radar 50 of the first embodiment includes the arm 12, which holds the transmission primary radiator 4 and the reception primary radiator 5 and which is pivotal in the elevation direction Y about the center axis A of the transmission radio wave lens 2 and the reception radio wave lens 3 as described above. The radio wave lens antenna device 1 includes the support members 13 for pivotally supporting the arm 12. The table 8 to which the support members 13 are fixed is rotatable in the azimuthal direction X about axis B, which is orthogonal to axis A. The primary radiators 4 and 5 pivot in the elevation direction Y about the center axis A in cooperation with the pivoting of the arm 12. The primary radiators 4 and 5 also pivot in the azimuthal direction X about axis B, which is orthogonal to the center axis A, in cooperation with the rotation of the table 8. Therefore, the entire atmosphere above the ground surface is beam scanned (i.e., volume scanned) by pivoting each of the primary radiators 4 and 5 (or the arm 12) within a predetermined angular range (i.e., −90° or greater to 0° or less) in the elevation direction Y and in the azimuthal direction X at a predetermined speed along the surfaces of the radio wave lenses 2 and 3. This significantly improves the time and spatial resolutions when performing volume scanning. As a result, the radar 50 is capable of performing volume scanning with a high time resolution and a high spatial resolution.

Specifically, the radar 50 in the first embodiment observes each of the azimuthal direction X (360°) and the elevation direction Y (90°) for every 3° when performing the volume scanning for one minute. That is, the radar 50 realizes the azimuth resolution of 3600 points of observation segments (when defining a spatial coordinate system with polar coordinates ($\gamma$, $\theta$, $\phi$), the resolution in the azimuthal direction $\phi$ and elevation direction $\theta$). The radar 50 realizes the observation segment of about 32000 points at a range resolution of 2.5 m in the range direction. Thus, volume scanning may be performed by resolving the atmosphere into about 3600× 32000 points of observation segments in one minute. In this manner, the radar 50 of the first embodiment enables volume scanning to be performed with a high time resolution and high spatial resolution.

(2) In the first embodiment, a large-scale drive mechanism for performing the volume scanning is unnecessary. Thus, the structure of the radio wave lens antenna 1 is simplified, and volume scanning is performed with a simple structure. This prevents the cost of the radio wave lens antenna device 1 from increasing and reduces the radio wave lens antenna device 1 is size and weight.

(3) In the first embodiment, the signal processing unit 52 generates a pulse compression modulation signal having a bandwidth set in a range of 5 MHz to 200 MHz, and the oscillator 60 frequency up-converts the pulse compression modulation signal to a signal having a center frequency of 1 GHz to 20 GHz and outputs the signal towards the atmosphere as the high-frequency radio waves (RF wave) 90. In such a structure, a high range resolution of 2.5 m is realized when generating a pulse compression modulation signal having a bandwidth of 60 MHz. Furthermore, in addition to rain droplets, clouds, and turbulence (winds) the radar 50 of the first embodiment may be used to observe tornadoes. A tornado may have a scale of 20 to 30 m depending on its magnitude. Therefore, by generating a pulse compression modulation signal having a bandwidth of 5 MHz (correspond to a range resolution of 30 m), the radar 50 would be useful for observing tornadoes having a scale of 20 m to 30 m.

(4) In the first embodiment, as described above, the signal processing unit 52 generates a pulse compression modulation signal by performing frequency chirp and alternately up-chirps and down-chirps for every transmission pulse. Such a structure improves the range resolution in the range direction. The observation error due to overlapping is suppressed by alternately generating the up-chirp and the down-chirp for every transmission pulse.

Second Embodiment

Figure 5:
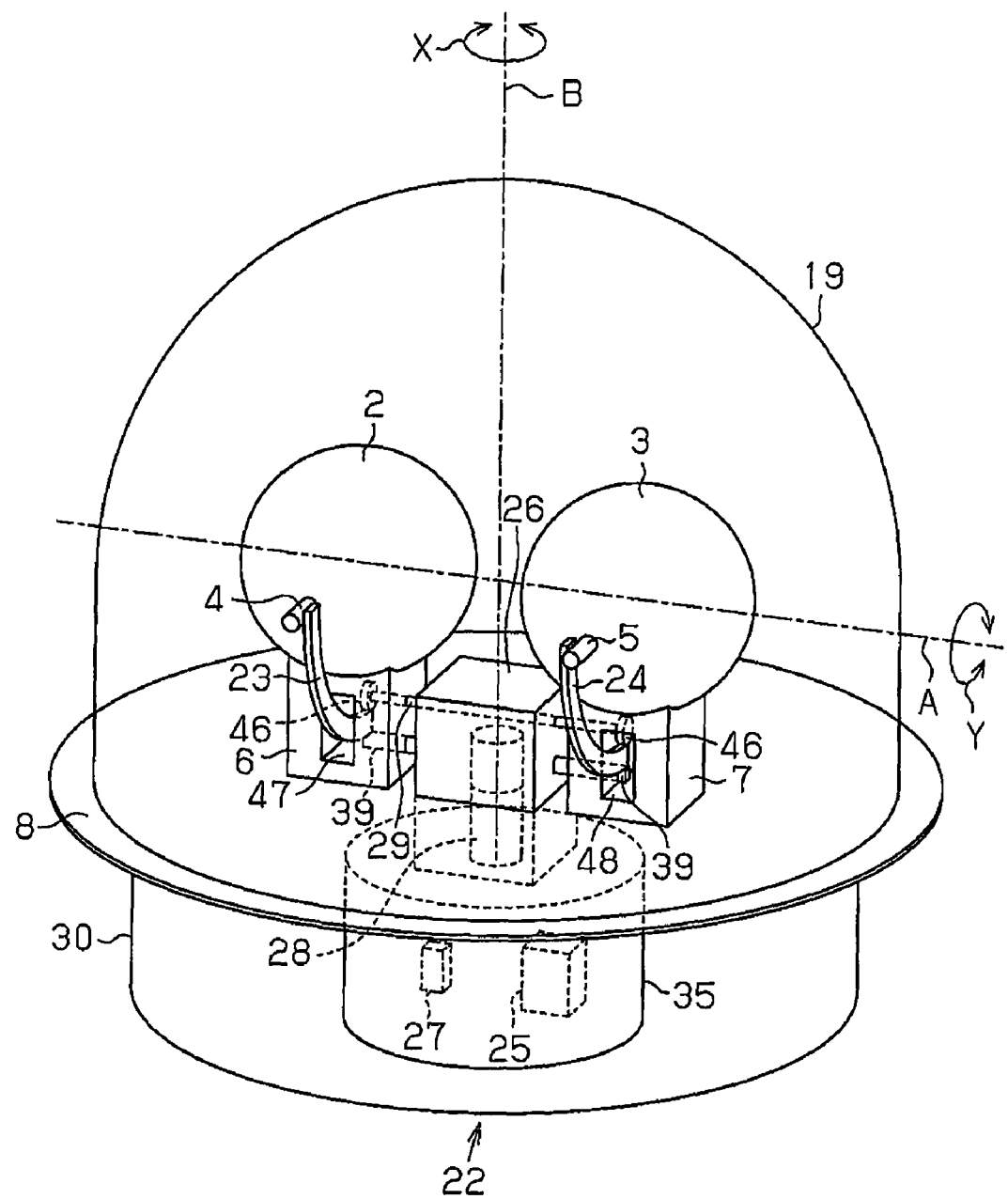
FIG. 5 is a schematic diagram showing the entire structure of a radio wave lens antenna device in a radar according to a second embodiment of the present invention.
Figure 6:
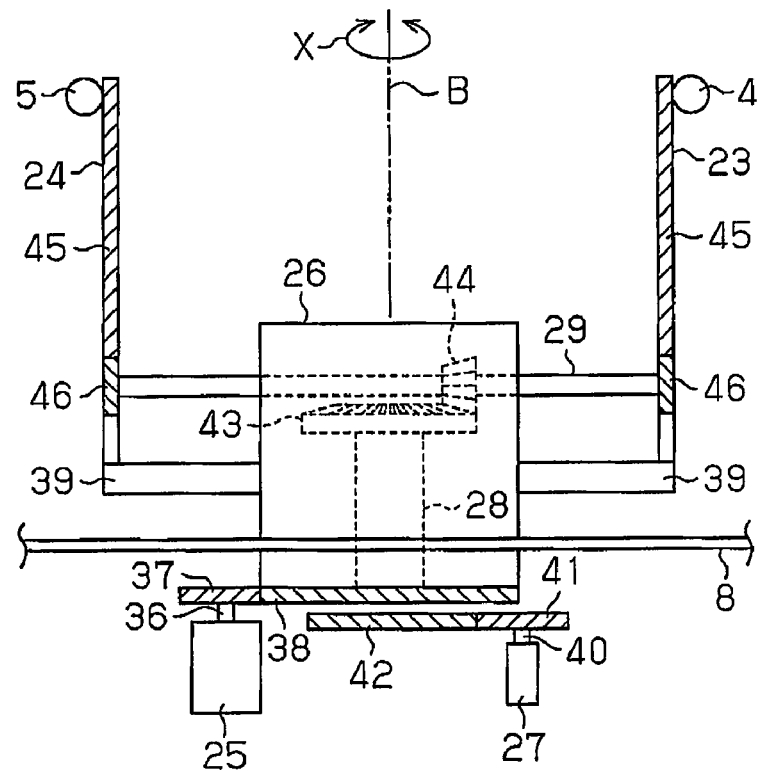
FIG. 6 is a schematic diagram showing a pivoting mechanism for a primary radiator in the radio wave lens antenna device shown in FIG. 5.
Figure 7:
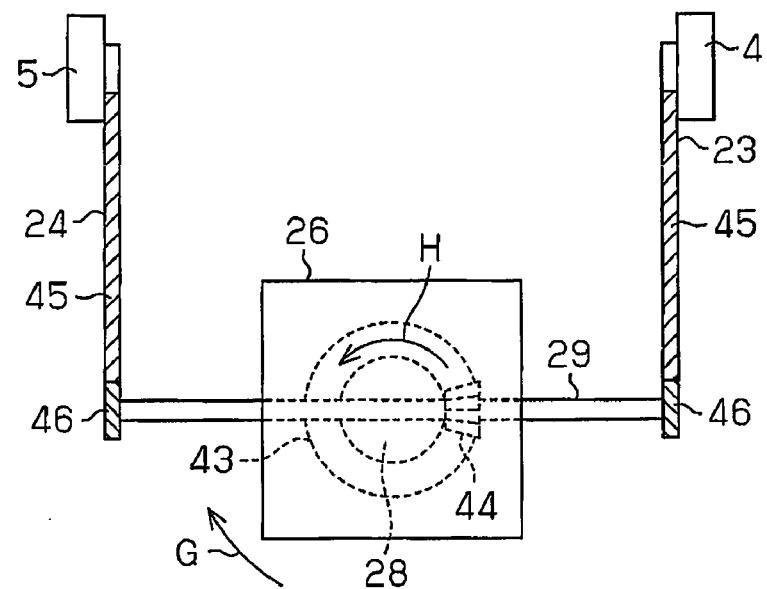
FIG. 7 is a plan view of FIG. 6.
Figure 8:
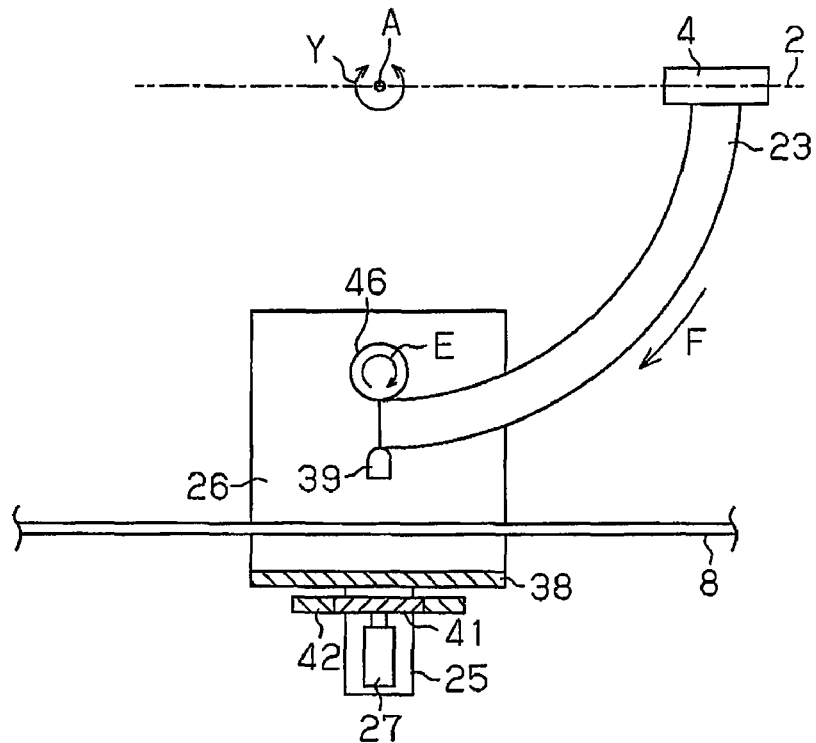
FIG. 8 is a side view of FIG. 6 when seen from the primary radiator side arranged at the focal point of the reception radio wave lens.

A second embodiment of the present invention will now be discussed. FIG. 5 is a schematic diagram showing the entire structure of a radio wave lens antenna device in a radar according to the second embodiment of the present invention. FIG. 6 is a schematic diagram showing a pivoting mechanism of a primary radiator in the radio wave lens antenna device shown in FIG. 5. FIG. 7 is a plan view of FIG. 6, and FIG. 8 is a side view of FIG. 6 seen from the primary radiator side arranged at the focal point of the transmission radio wave lens. The same reference characters are given to those components that are the same as the corresponding components of the first embodiment and such components will not be described. The entire structure of the radar using the radio wave lens antenna device is also similar to that of the above-described first embodiment and thus will not be described in detail.

The second embodiment has a feature in which the pivoting mechanism of the primary radiators 4 and 5 in the azimuthal direction X and the elevation direction Y differs from that of the radio wave lens antenna device 1 in the first embodiment. As shown in FIG. 5, a radio wave lens antenna device 22 of the second embodiment includes arms 23 and 24 serving as holding members for holding the primary radiators 4 and 5. The primary radiators 4 and 5 are held by the arms 23 and 24 to be pivotal in the elevation direction Y in a state in which the primary radiators 4 and 5 remain at their respective focal points. The arms 23 and 24 are not particularly limited as long as they are formed from a light material in the same manner as the above-described arm 12. For instance, the arms 23 and 24 may be formed from metal or wood.

As shown in FIG. 6, the radio wave lens antenna device 22 includes a motor 25, which produces rotation in forward and reverse directions, and a shaft 26, which is connected to the motor 25 and rotated in forward and reverse directions by the motor 25. The motor 25 and the shaft 26 form a drive means for driving the table 8.

As shown in FIG. 6, the radio wave lens antenna device 22 includes a motor 27, which produces rotation in forward and reverse directions, a shaft 28, which is connected to the motor 27 and rotated in forward and reverse directions by the motor 27, and a shaft 29, which is connected to the shaft 28 and rotated in the forward and reverse directions by the motor 27. The motor 27 and the shafts 28 and 29 form a drive means for driving the arms 23 and 24.

As shown in FIGS. 5 and 6, the motors 25 and 27 are housed in a motor housing portion 35 defined in a base 30. The shafts 26 and 28 partially project out of the base 30 and upward from of the table 8. As shown in FIGS. 5 and 6, the shaft 26 is attached to the table 8, and the table 8 rotates when the shaft 26 is rotated in forward and reverse directions. Furthermore, as shown in FIGS. 5 and 6, the arms 23 and 24 holding the primary radiators 4 and 5 are each pivotally supported by a support member 39, which is fixed to the shaft 26.

During scanning, when a computer (not shown) serving as a control means drives the motor 25 and rotates a shaft 36, the drive force of the motor 25 is transmitted to the shaft 26 by a drive gear 37 connected to the shaft 36 of the motor 25 and a shaft gear 38 arranged on the shaft 26 and mated with the drive gear 37. As a result, the drive force of the motor 25 is transmitted to the table 8 by the shaft 26. This rotates the table 8 in the azimuthal direction X about axis B, which is orthogonal to the center axis A of the radio wave lenses 2 and 3.

As described above, the primary radiators 4 and 5 are held by the arms 23 and 24, respectively. The arms 23 and 24 are supported by the support members 39, which are attached to the table 8. Therefore, each of the primary radiator 4 and 5 pivots in the azimuthal direction X about axis B, which is orthogonal to the center axis A of the radio wave lenses 2 and 3, in cooperation with the rotation of the table 8 in the azimuthal direction X. Thus, volume scanning may be performed in any azimuthal directions X in a manner similar to the first embodiment.

In the same manner as the arm 12 of the first embodiment, the arms 23 and 24 are pivotal in the elevation direction Y about the center axis A of the radio wave lenses 2 and 3. More specifically, when the computer (not shown) drives the motor 27 and rotates a shaft 40 of the motor 27, the drive force of the motor 27 is transmitted to the shaft 28 by a drive gear 41, which is connected to the shaft 40 of the motor 27, and a shaft gear 42, which is arranged on the shaft 28 and mated with the drive gear 41. As shown in FIGS. 6 and 7, an annular gear 43 is arranged on the shaft 28, and a drive gear 44 is mated with the annular gear 43. The annular gear 43 and the drive gear 44 form a bevel gear mechanism. The shaft 29 is arranged on the drive gear 44 so as to rotate integrally with the drive gear 44 in forward and reverse directions. The shaft 29 includes shaft gears 46, each mated with a gear 45 formed on the surface of the arm 23 or 24. Therefore, when the drive force of the motor 27 transmitted to the shaft 28 is transmitted to the shaft 29 by the annular gear 43 and the drive gear 44, the drive force is further transmitted to the arms 23 and 24 by the shaft gears 46 and the gears 45. This pivots the arms 23 and 24, and the primary radiators 4 and 5 held by the arms 23 and 24 pivot in the elevation direction Y about the center axis A of the radio wave lenses 2 and 3 in cooperation with the pivoting of the arm 12.

Figure 9:
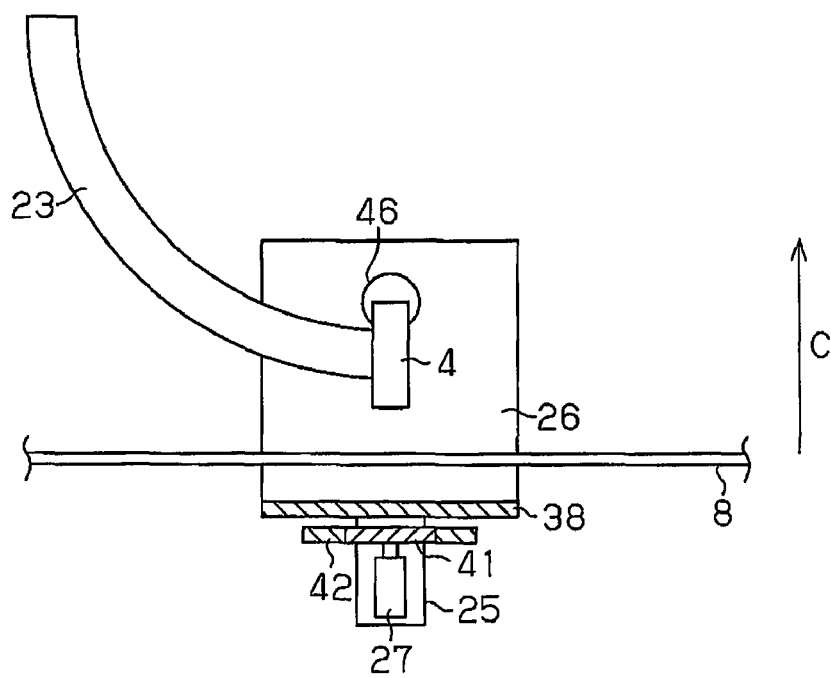
FIG. 9 is a view showing a state in which the primary radiator is pivoted to a state of scanning the zenithal direction in the elevation direction.

For example, when the horizontal direction Z is defined as 0° in the elevation direction Y, the primary radiator 4 is configured to be pivotal from a state in which it scans the horizontal direction Z as shown in FIG. 8 to a state in which it scans the zenithal direction C (i.e., state pivoted to −90°) as shown in FIG. 9. In this case, when the shaft gear 46 rotates in the clockwise (direction of arrow E indicated in FIG. 8) in the elevation direction Y, the arm 23 pivots in the clockwise direction (direction of arrow F indicated in FIG. 8) in the elevation direction Y about the center axis A.

In a manner similar to the first embodiment, as shown in FIG. 5, in the second embodiment, retaining portions 47 and 48, which are similar to the retaining portions 17 and 18 for retaining the primary radiators 4 and 5 shown in FIG. 3, are formed in the support members 6 and 7, which respectively support the radio wave lenses 2 and 3. This avoids interference between the primary radiator 4 and the support member 6 and interference between the primary radiator 5 and the support member 7.

In a manner similar to the first embodiment, in the second embodiment, when defining the horizontal direction as 0° and the vertically downward direction as −90° in the elevation direction Y, the primary radiators 4 and 5 are arranged so as to be pivotal in a range of −90° or greater to 90° or less about the center axis A. This enables complicated volume scanning to be performed with ease using a simple structure.

Due to the above-described structure, the radar using the radio wave lens antenna device 22 of the second embodiment has the same advantages as advantages (1) to (4) of the radar 50 in the first embodiment.

When the motor 25 is driven, as described above, the table 8 rotates in the azimuthal direction X about axis B, which is orthogonal to the center axis A of the radio wave lenses 2 and 3. In this case, even if the motor 27 is not driven and the drive force of the motor 27 is not transmitted to the shaft 28, the torque generated by the motor 25 may rotate the drive gear 44 with the shaft 29. As a result, the shaft 29 and the shaft gears 46 are rotated by the drive gear 44, and the arms 23 and 24 and the primary radiators 4 and 5, which are held by the arms 23 and 24, pivot in the elevation direction Y. In such a case, the motor 27 is driven so that the shaft 28 rotates in a direction opposite to the rotating direction of the shaft 26 rotated by the drive force of the motor 25. This controls the pivoting of the primary radiators 4 and 5 held by the arms 23 and 24 in the elevation direction Y.

More specifically, for example, in the state shown in FIG. 8, when the shaft 26 is driven by the motor 25 and rotated clockwise as shown by arrow G in FIG. 7, the torque generated by the motor 25 rotates the drive gear 44 clockwise as shown by arrow E in FIG. 8. The arm 23 then pivots clockwise as shown by arrow F in FIG. 8 in the elevation direction Y about the center axis A. In this case, the motor 27 is driven so that the shaft 28 rotates in the direction opposite to the rotating direction of the shaft 26 (counterclockwise as shown by arrow H in FIG. 7) so that the drive gear 44 rotates in the direction opposite to the direction shown by arrow E in FIG. 8 (counterclockwise as viewed in FIG. 8). Thus, in the drive gear 44, the rotating direction of the torque generated by the motor 25 is opposite to the rotating direction of the drive force generated by the motor 27. This decreases the torque of the motor 25 that acts on the drive gear 44 and controls the pivoting (or pivoting speed) in the elevation direction Y of the primary radiators 4 and 5 held by the arms 23 and 24.

The present invention is not limited to the above-described embodiments, and the present invention may undergo various design changes without departing from the scope of the invention.

Figure 10:
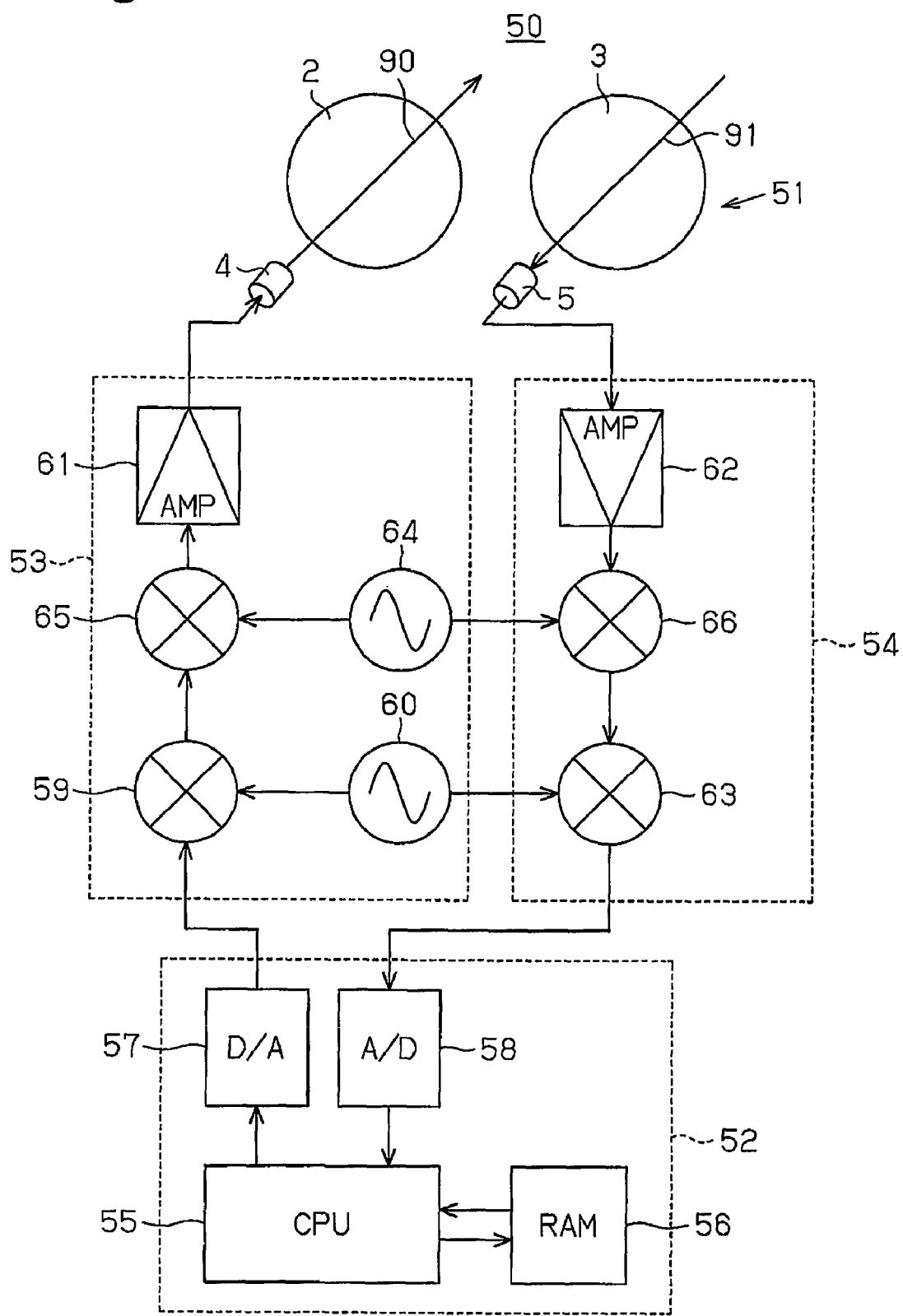
FIG. 10 is a schematic diagram showing the entire structure of a modification of the radar according to the present embodiment.

For example, in the above-described embodiment, a single oscillator 60 frequency up-converts a pulse compression modulation signal to a signal having a center frequency of 1 GHz to 20 GHz and frequency down-converts a received RF signal. However, a radar according to the present invention may include a plurality of oscillators. As shown in FIG. 10, the transmitter unit 53 may include a further oscillator 64 for frequency up-converting the pulse compression modulation signal and frequency down-converting the received RF signal in the radar 50. In this case, a pulse compression modulation signal, which is frequency up-converted by the oscillator 60, is input to another mixer 65 in the transmitter unit 53. The pulse compression modulation signal input to the mixer 65 is then frequency up-converted once more by the other oscillator 64 to generate a signal having a center frequency of 1 GHz to 20 GHz. For example, in the above description, the radar 50 shown in FIG. 4 transmits a signal of 15 GHz from the oscillator 60. However, the radar 50 shown in FIG. 10 may transmit a signal of 2 GHz from the oscillator 60 and transmit a signal of 13 GHz from the other oscillator 64 so as to transmit a signal of 15 GHz in combination. In this case, the amplifier 61 amplifies the frequency up-converted pulse compression modulation signal, generates the RF signal, and transmits the RF signal to the primary radiator 4 of the antenna unit 51. The primary radiator 4 radiates the RF signal towards the atmosphere through the transmission radio wave lens 2 as the high-frequency radio waves (RF waves) 90. The RF signal input to the receiver unit 54 is amplified by the amplifier 62, and the amplified RF signal is input to a further mixer 66 arranged in the receiver unit 54. The oscillator 64 then frequency down-converts the high-frequency signal input to the mixer 66 to generate an IF signal. The oscillator 60 then frequency down-converts the IF signal input to the mixer 63 once more and transmits the down-converted IF signal to the signal processing unit 52 as an analog signal. The IF signal provided to the signal processing unit 52 is input to the A/D converter 58 of the signal processing unit 52. The A/D converter 58 performs pulse compression demodulation to convert the analog signal (IF signal) to a digital signal and outputs the digital signal to the CPU 55. In such a structure, the pulse compression modulation signal is frequency up-converted to a signal having the desired center frequency in a plurality of steps, and the received RF signal is frequency down-converted in a plurality of steps. Therefore, compared to when using only one oscillator, the frequency up-conversion and frequency down-conversion of a signal to the desired center frequency may be performed more easily. The advantages of the radar 50 are also obtained by the radar using the radio wave lens antenna device 22 that includes the further oscillator 64.

Figure 11:
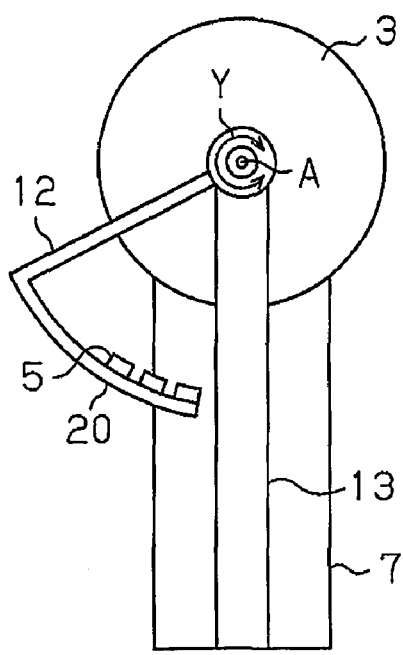
FIG. 11 is a schematic diagram showing a modification of a radio wave lens antenna device according to an embodiment of the present invention and is a view showing a state in which a plurality of primary radiators are arranged in the elevation direction.

In the above-described embodiment, the radio wave lens antenna device 1 employs a structure for holding the single transmission primary radiator 4 and the single reception primary radiator 5 with the arm 12. However, the arm 12 may be extended and curved in the elevation direction Y, and a plurality of the primary radiators 4 and 5 may be held on the extended portion of the arm 12 along the elevation direction Y. For example, as shown in FIG. 11, three reception primary radiators 5 may be held on the extended portion 20 of the arm 12 that is curved in the elevation direction Y. In such a structure, a plurality of signals may be simultaneously transmitted and received in the elevation direction Y. Accordingly, a plurality of segments may be simultaneously measured, and the simultaneity of the collected data may be improved. Further, the scanning time in the elevation direction Y may be reduced. When simultaneously receiving a plurality signals with the plurality of reception primary radiators 5, a plurality of (e.g., fifteen) primary radiators 5 may be arranged at an interval of 5° in the elevation direction Y. In the radio wave lens antenna device 22, the same advantages may be obtained when the plurality of primary radiators 4 and 5 are held by the arms 23 and 24 along the elevation direction Y. In this case, the oscillator 64 shown in FIG. 10 may also be used.

The arms 12, 23 and 24 may be formed by waveguides. A waveguide generally has less high-frequency transmission loss than a coaxial cable and has superior mechanical strength. In each embodiment, the primary radiators 4 and 5 are respectively connected to the transmitter unit 53 and the receiver unit 54. Thus, the arms 12, 23 and 24 may be used as a low-loss transmission path by using a waveguide for the arms 12, 23 and 24 and connecting the waveguide to the primary radiators 4 and 5. This saves space since a coaxial cable connected to the primary radiators 4 and 5 is not necessary.

Figure 12:
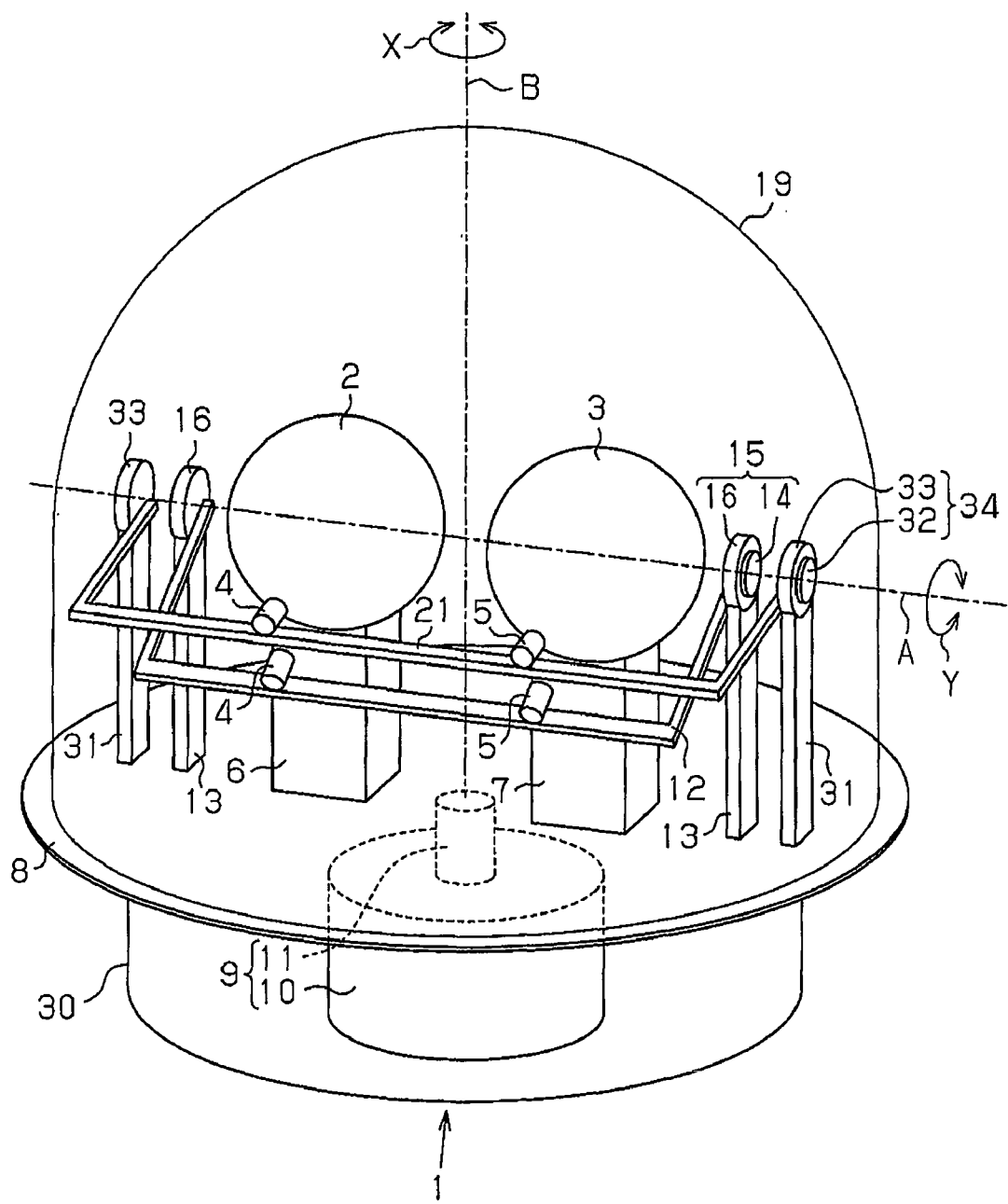
FIG. 12 is a schematic diagram showing a modification of the radio wave lens antenna device in the radar according to the first embodiment of the present invention and is a view showing a state in which a plurality of arms are used.

As shown in FIG. 12, a plurality of arms 12 (two in FIG. 12) may be used to hold primary radiators 4 and 5 and be configured to be pivotal in the elevation direction Y about the axis A connecting the center points of the radio wave lenses 2 and 3. In this case, as shown in FIG. 12, an arm 21, which serves as a holding member for holding the primary radiators 4 and 5, is attached to pins 32 of support members 31 attached to the table 8 so as to be pivotally supported by support members 31. A drive means 34 shown in FIG. 12 is a drive source for driving the arm 21 and includes a motor 33, which produces rotation in forward and reverse directions, and the pins 32, which are connected to the motor 33 and rotated in the forward and reverse directions by the motor 33. A computer drives the motor 33 and rotates the pins 32. This transmits the drive force of the motor 33 to the arm 21 through the pins 32. As a result, the arm 21 is pivoted, and the primary radiators 4 and 5 held by the arm 21 pivot in the elevation direction Y about the center axis A of the radio wave lenses 2 and 3 in cooperation with the pivoting of the arm 21.

The drive means 34 may be arranged in the support members 13 instead of the support members 31. The arm 21 (or primary radiators 4 and 5 held by the arm 21) is formed in the same manner as the arm 12 (or primary radiators 4 and 5 held by the arm 12). That is, the arm 21 is configured to be pivotal in a range of −90° or greater to 90° or less in the elevation direction Y about the center axis A of the radio wave lenses 2 and 3 when performing the scanning. Furthermore, the transmitter unit 53 is connected to the primary radiator 4 of the arm 12 and the primary radiator 4 of the arm 21 by a switch (not shown) serving as a switching means so that either one of the primary radiators 4 may be selected by a switch signal from the computer. In the same manner, the receiver unit 54 is connected to the primary radiator 5 of the arm 12 and the primary radiator 5 of the arm 21 by a switch (not shown) serving as a switching means so that either one of the primary radiators 5 may be selected by a switch signal from the computer. Since such a switch is an electronic switch, the time required for switching is sufficiently short such that it can be ignored. The switch may be arranged between the primary radiators 4 and 5 and the transmitter unit 53 or and between the primary radiators 4 and 5 and the receiver unit 54.

Volume scanning is started, for example, in a state in which the arm 12 is arranged at a first reference position (elevation angle of 0 degrees), the arm 21 is arranged at a second reference position (elevation angle of 45 degrees), and the table 8 is arranged at an azimuth reference position (azimuth angle of 0 degrees). More specifically, the table 8 is first rotated in the azimuthal direction X in a state in which the primary radiators 4 and 5 attached to the arm 12 are selected by the switch, and scanning is performed for every degree (elevation angle of 0 degree fixed) in the azimuthal direction X. Pivoting is performed in the azimuthal direction for 359 degrees. Before reaching 360 degrees (i.e., azimuth reference position), the primary radiators 4 and 5 attached to the arm 21 are selected by the switch. The scanning is then performed for every degree from the azimuth reference position until reaching 360 degrees with the elevation angle fixed at 45 degrees. Then, during the period in which scanning is performed by the arm 21, the arm 12 is pivoted one degree in the elevation direction Y to be arranged at a third reference position (elevation angle of one degree). The table 8 is rotated 359 degrees. Before being rotated to 360 degrees (i.e., azimuth reference position), the primary radiators 4 and 5 of the arm 12 are selected again by the switch. The scanning is then performed for every degree from the azimuth reference position until reaching 360 degrees with the elevation angle fixed at one degree. While scanning is being performed by the arm 12, the arm 21 is pivoted one degree in the elevation direction to be arranged at a fourth reference position (elevation angle of 46 degrees). Thereafter, scanning is performed by pivoting the two arms 12, 21 while performing switching in the same manner. With such a structure, the rotation of the table 8 in the azimuthal direction X does not need to be stopped and thereby does not involve acceleration or deceleration. Thus, the scanning time is reduced compared to when provided with only the arm 12. As a result, beam scanning can be performed at high speeds.

Figure 13:
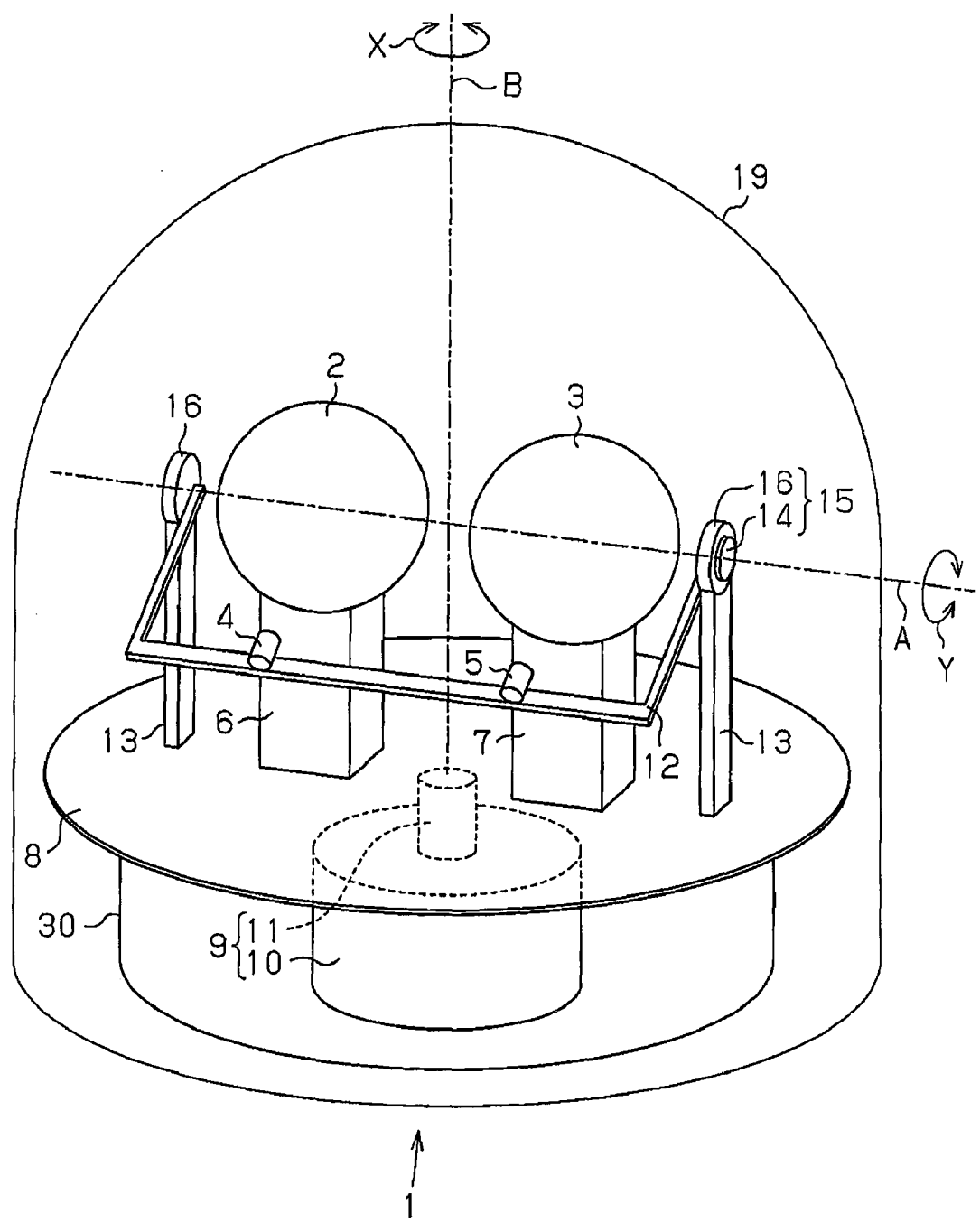
FIG. 13 is a schematic diagram showing a modification of the radio wave lens antenna device in the radar according to the first embodiment of the present invention and is a view showing a state in which the entire radio wave lens antenna device is covered by a radome.

In the above embodiments, the radome 19 is supported by the table 8. However, as shown in FIG. 13, the table 8, the drive means 9, and the base 30 may be accommodated in the radome 19 so that the entire radio wave lens antenna device 1 is covered by the radome 19. Such a structure reduces the weight on the table 8 and thus decreases the load applied to the drive means 9 when rotating the table 8. Further, this improves the outer appearance of the radio wave lens antenna device 1. In the same manner, with the radio wave lens antenna device 22 shown in FIG. 11, the table 8, the motor housing portion 35, and the base 30 may be accommodated in the radome 19, and the entire radio wave lens antenna device 22 may be covered by the radome 19. This obtains the same advantages.

Figure 14:
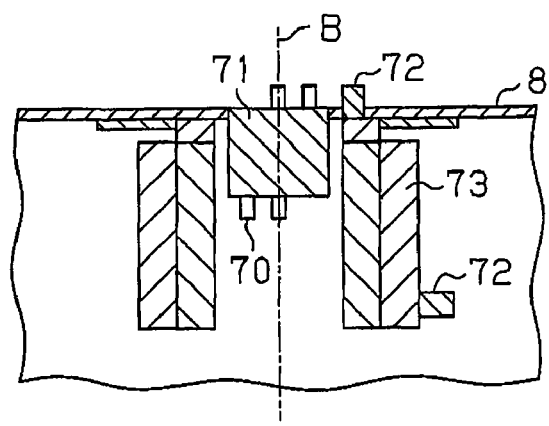
FIG. 14 is a view showing a state in which a rotary joint is arranged in the radio wave lens antenna device in the radar according to the embodiment of the present invention.

As shown in FIG. 14, a rotary joint 71 including a connector 70, which is connected to a coaxial cable or a waveguide for transmitting a high-frequency signal, may be arranged at the central part of the table 8 so as to extend from the upper part to the lower part of the table 8. This effectively prevents entwining and twisting of the coaxial cable or waveguide. The rotary joint 71 may be combined with a slip ring 73, which includes a connector 72, so that, for example, even if a drive power supply is arranged below the table 8, power can be efficiently supplied to the motor 16 in the drive means 15 of the arm 12 arranged above the table 8.

In the above-described embodiments, the transmission radio wave lens 2 and the transmission primary radiator 4 may be used for reception of signals (or the reception radio wave lens 3 and the reception primary radiator 5 may be used for transmission of signals) so that two radio wave lenses 2 and 3 and two primary radiators 4 and 5 are used for reception of signals (or transmission of signals). In such a structure, the gain of the radio wave lens antenna device 1 is increased by two times, and the beam width becomes sharp.

The transmitter unit 53, the receiver unit 54, and the like shown in FIG. 4 may be arranged in vacant space above the table 8. In such a structure, space is effectively used, the radar 50 may be reduced in size, and loss between the radio wave lens antenna device 1 and the transmitter unit 53 and the receiver unit 54 is suppressed. This enables the observation range to be improved.

The arm 12 for holding the primary radiators 4 and 5 is generally horseshoe-shaped. However, the shape of the arm 12 is not particularly limited as long as the reception primary radiator 4 may be arranged at the focal point of the transmission radio wave lens 2 and the transmission primary radiator 5 may be arranged at the focal point of the reception radio wave lens 3. The arm 12 may be formed to be generally arcuate.

The retaining portions 17 and 18 are each formed to have a cross-section that is generally horseshoe-shaped. However, the shape of the retaining portions 17 and 18 is not particularly limited as long as interference between the primary radiator 4 and the support member 6 or interference between the primary radiator 5 and the support member 7 is avoided. The retaining portions 17 and 18 may be formed to have a cross-section that is generally arcuate.

Figure 15:
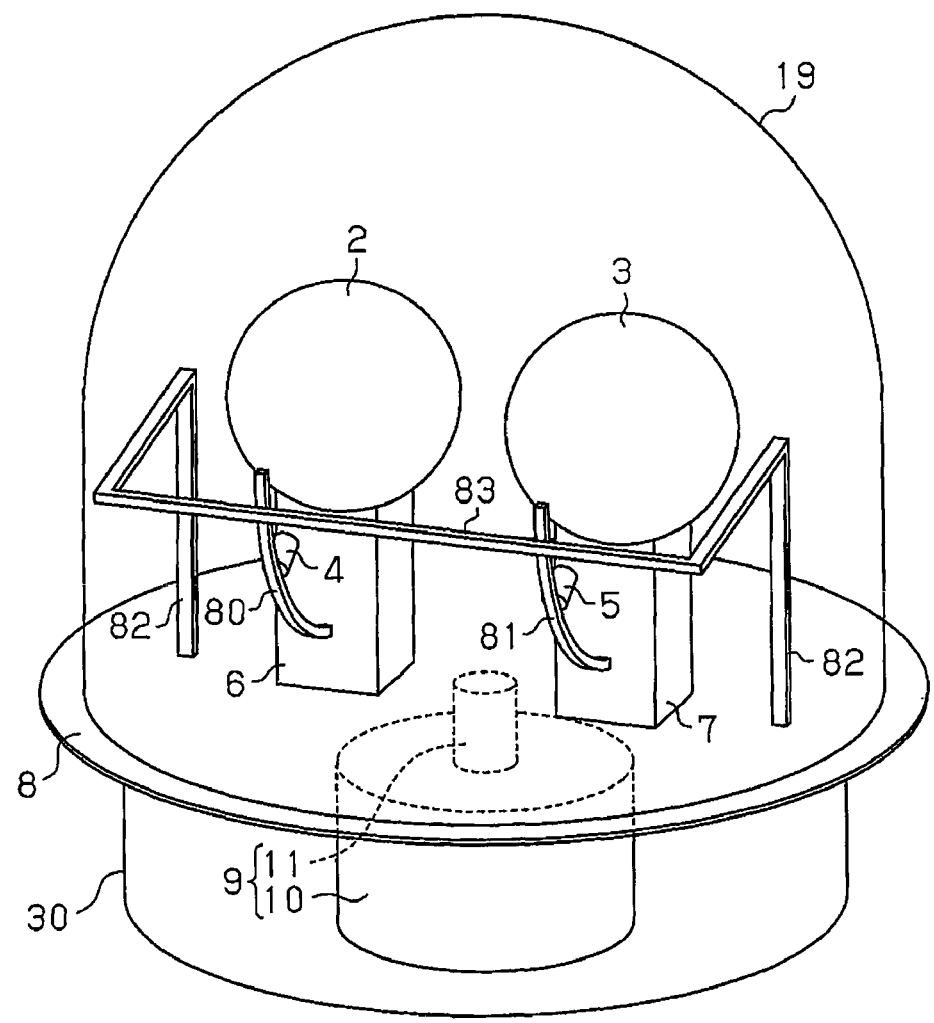
FIG. 15 is a schematic diagram showing a modification of the radio wave lens antenna device in the radar according to the embodiment of the present invention.

As shown in FIG. 15, a structure in which rails 80 and 81, which are support members for supporting the primary radiators 4 and 5, are arranged so that the primary radiators 4 and 5 are pivotal in the elevation direction Y while the primary radiator 4 is maintained in a state arranged at the focal point of the radio wave lens 2 and the primary radiator 5 is maintained in a state arranged at the focal point of the radio wave lens 3. In this case, as shown in FIG. 15, the rail 80 for supporting the primary radiator 4 is attached to an arm 83, which is fixed to a support member 82 attached to the table 8, and the support member 6. The rail 81 for supporting the primary radiator 5 is attached to the arm 83 and the support member 7. The primary radiator 4 arranged at the focal point of the radio wave lens 2 and the primary radiator 5 arranged at the focal point of the radio wave lens 3 are each configured to move in the elevation direction Y along the rail 80 and 81 pivot in the azimuthal direction X about the axis B orthogonal to the center axis A in cooperation with the rotation of the table 8 when performing scanning. In such a structure, the same advantages as the radar 50 shown in FIG. 4 are obtained.

In this case, when the horizontal direction is defined as 0° and the vertically downward direction is defined as −90° in the elevation direction Y, the primary radiators 4 and 5 are configured to be pivotal in a range of −90° or greater to 90° or less about the center axis A, complicated volume scanning may be performed with ease using a simple structure. Furthermore, in the same manner as the radio wave lens antenna device 1 shown in FIG. 1, the retaining portions 17 and 18 for retaining the primary radiators 4 and 5 may be formed in the support members 6 and 7 to support the radio wave lenses 2 and 3. There may be more than one of each of the primary radiators 4 and 5 arranged in the elevation direction Y so that a plurality of signals can be simultaneously transmitted and received in the elevation direction Y. This improves the simultaneity of the collected data and reduces the scanning time in the elevation direction Y.

In the above-described embodiments, a single D/A converter 57 and a single A/D converter 58 are arranged in the signal processing unit 52. However, there may be any number of converters as long as there it is at least one D/A converter and at least one A/D converter.

In the above-described embodiments, a meteorological radar is given as an example of a radar using the radio wave lens antenna device 1 or 22. However, it is apparent that the radio wave lens antenna devices 1 and 22 may be used in other radars. For instance, the radar may be a wind velocity radar that observes atmospheric motion (wind or turbulence) in the atmospheric layer directly influenced by radiation and absorption from the ground surface to observe wind directions and wind velocities at each altitude.

INDUSTRIAL APPLICABILITY

The present invention may be applied to a radar for transmitting and receiving high-frequency radio waves with a radio wave lens antenna device.

The invention claimed is:

1. A radar comprising:
a signal processing unit including at least one D/A converter, which converts a pulse compression modulation signal of digital waveform data to an analog waveform, and at least one A/D converter, which converts a received analog signal to a digital signal;
a transmitter unit including at least one oscillator, which frequency up-converts the pulse compression modulation signal of the analog waveform generated by the signal processing unit, and a first amplifier, which amplifies the frequency up-converted pulse compression modulation signal and generates an RF signal;
an antenna unit which radiates the RF signal generated by the transmitter unit towards the atmosphere as RF waves and receives RF waves reflected or scattered in the atmosphere and returned as a RF signal; and
a receiver unit including a second amplifier which amplifies the RF signal received by the antenna unit, in which the receiver frequency-down converts the RF signal, which is amplified by the second amplifier, with the at least one oscillator to generate an IF signal and provides the IF signal to the signal processing unit as the analog signal;
the radar being characterized in that
the antenna unit includes:
first and second transmission-reception radio wave lenses, in which the first and second transmission-reception radio wave lenses each include a focal point and are each formed from a dielectric to be spherical so as to have a relative permittivity that varies at a predetermined rate in a radial direction; and
first and second transmission-reception primary radiators respectively arranged at the focal points of the first and second transmission-reception radio wave lenses;
wherein the first and second transmission-reception primary radiators are configured to pivot in an elevation direction about a first axis connecting a center point of each of the first and second transmission-reception radio wave lenses and pivot in an azimuthal direction about a second axis orthogonal to the first axis.

2. The radar according to claim 1, wherein the antenna unit further includes:
a holding member which holds the first and second transmission-reception primary radiators pivotally in the elevation direction;
a support member which pivotally supports the holding member; and
a rotary member which fixes the support member and is rotatable in the azimuthal direction about the second axis;
wherein the first and second transmission-reception primary radiators pivot in the elevation direction in cooperation with the pivoting of the holding member and pivot in the azimuthal direction in cooperation with the rotation of the rotary member.

3. The radar according to claim 2, wherein the transmitter unit further includes another oscillator for frequency up-converting the pulse compression modulation signal and frequency down-converting the received RF signal.

4. The radar according to claim 3, wherein:
the signal processing unit generates the pulse compression modulation signal with a bandwidth settable in a range of 5 MHz to 200 MHz; and
the at least one oscillator frequency up-converts the pulse compression modulation signal to a signal having a center frequency of 1GHz to 20 GHz.

5. The radar according to claim 4, wherein the signal processing unit generates the pulse compression modulation signal by performing pulse compression modulation with a frequency chirp, and alternately repeats up-chirping and down-chirping for every transmission pulse.

6. The radar according to claim 5, further comprising an at least one third transmission-reception primary radiator arranged along the elevation direction at the focal point of at least one of the first and the second transmission-reception radio wave lenses.

7. The radar according to claim 2, wherein:
the signal processing unit generates the pulse compression modulation signal with a bandwidth settable in a range of 5 MHz to 200 MHz; and
the at least one oscillator frequency up-converts the pulse compression modulation signal to a signal having a center frequency of 1 GHz to 20 GHz.

8. The radar according to claim 7, wherein the signal processing unit generates the pulse compression modulation signal by performing pulse compression modulation with a frequency chirp, and alternately repeats up-chirping and down-chirping for every transmission pulse.

9. The radar according to claim 8, further comprising an at least one third transmission-reception primary radiator arranged along the elevation direction at the focal point of at least one of the first and the second transmission-reception radio wave lenses.

10. The radar according to claim 2, wherein the signal processing unit generates the pulse compression modulation signal by performing pulse compression modulation with a frequency chirp, and alternately repeats up-chirping and down-chirping for every transmission pulse.

11. The radar according to claim 10, further comprising an at least one third transmission-reception primary radiator arranged along the elevation direction at the focal point of at least one of the first and the second transmission-reception radio wave lenses.

12. The radar according to claim 1 wherein the transmitter unit further includes another oscillator for frequency up-converting the pulse compression modulation signal and frequency down-converting the received RF signal.

13. The radar according to claim 12, wherein:
the signal processing unit generates the pulse compression modulation signal with a bandwidth settable in a range of 5 MHz to 200 MHz; and
the at least one oscillator frequency up-converts the pulse compression modulation signal to a signal having a center frequency of 1 GHz to 20 GHz.

14. The radar according to claim 13, wherein the signal processing unit generates the pulse compression modulation signal by performing pulse compression modulation with a frequency chirp, and alternately repeats up-chirping and down-chirping for every transmission pulse.

15. The radar according to claim 14, further comprising an at least one third transmission-reception primary radiator arranged along the elevation direction at the focal point of at least one of the first and the second transmission-reception radio wave lenses.

16. The radar according to claim 12, wherein the signal processing unit generates the pulse compression modulation signal by performing pulse compression modulation with a frequency chirp, and alternately repeats up-chirping and down-chirping for every transmission pulse.

17. The radar according to claim 16, further comprising an at least one third transmission-reception primary radiator arranged along the elevation direction at the focal point of at least one of the first and the second transmission-reception radio wave lenses.

18. The radar according to claim 1, wherein:
the signal processing unit generates the pulse compression modulation signal with a bandwidth settable in a range of 5 MHz to 200 MHz; and
the at least one oscillator frequency up-converts the pulse compression modulation signal to a signal having a center frequency of 1 GHz to 20 GHz.

19. The radar according to claim 1, wherein the signal processing unit generates the pulse compression modulation signal by performing pulse compression modulation with a frequency chirp, and alternately repeats up-chirping and down-chirping for every transmission pulse.

20. The radar according to claim 1, further comprising an at least one third transmission-reception primary radiator arranged along the elevation direction at the focal point of at least one of the first and the second transmission-reception radio wave lenses.

* * * * *